United States Patent
Huang

(10) Patent No.: US 10,253,748 B2
(45) Date of Patent: Apr. 9, 2019

(54) WATER WAVE-TYPE POWER GENERATING DEVICE

(71) Applicant: Kuo-Chang Huang, Tainan (TW)

(72) Inventor: Kuo-Chang Huang, Tainan (TW)

( * ) Notice: Subject to any disclaimer, the term of this patent is extended or adjusted under 35 U.S.C. 154(b) by 163 days.

(21) Appl. No.: 15/362,853

(22) Filed: Nov. 29, 2016

(65) Prior Publication Data

US 2017/0152831 A1  Jun. 1, 2017

(30) Foreign Application Priority Data

Dec. 1, 2015 (TW) ............................. 104140040 A

(51) Int. Cl.
| | | |
|---|---|---|
| F03B 13/16 | (2006.01) | |
| F03B 13/18 | (2006.01) | |
| F03B 17/06 | (2006.01) | |

(52) U.S. Cl.
CPC .......... F03B 13/16 (2013.01); F03B 13/1835 (2013.01); F03B 17/066 (2013.01); F05B 2220/706 (2013.01); F05B 2240/91 (2013.01); F05B 2240/93 (2013.01); F05B 2260/4031 (2013.01); Y02E 10/28 (2013.01); Y02E 10/38 (2013.01)

(58) Field of Classification Search
CPC ...... F03B 13/26; F03B 13/16; F05B 2240/93; F05B 2260/4031; F05B 2220/706
See application file for complete search history.

(56) References Cited

U.S. PATENT DOCUMENTS

| | | | | |
|---|---|---|---|---|
| 3,817,662 A | * | 6/1974 | Sterk | F03B 13/1845 417/333 |
| 3,922,012 A | * | 11/1975 | Herz | F03B 17/065 290/43 |
| 4,465,941 A | * | 8/1984 | Wilson | F03B 13/08 290/42 |
| 4,516,033 A | * | 5/1985 | Olson | F03B 17/062 290/42 |
| 5,136,174 A | * | 8/1992 | Simoni | F03B 17/062 290/43 |
| 7,161,269 B2 | * | 1/2007 | Kayama | B06B 1/045 310/81 |
| 2008/0116692 A1 | * | 5/2008 | Lagstrom | F03B 13/26 290/54 |
| 2008/0190105 A1 | * | 8/2008 | Tai | F03B 13/181 60/498 |
| 2008/0303284 A1 | * | 12/2008 | Clemens | F03B 17/066 290/54 |

(Continued)

*Primary Examiner* — Mark Laurenzi
*Assistant Examiner* — Shafiq Mian
(74) *Attorney, Agent, or Firm* — Burris Law, PLLC

(57) ABSTRACT

A water wave-type power generating device is mounted on a shore, and includes a hub, a power generating unit, a transmitting track unit surrounding and movable relative to the hub along an endless course to generate a rotational force, a rotation transmitting unit coupled with the transmitting track unit and receiving the rotational force to generate the torque that is transmitted to the power generating unit by a torque transmitting unit, and a plurality of wave heading members disposed on the transmitting track unit and each having a heading surface that is subjected to waves of water in a wave ascending direction so as to actuate the movement of the transmitting track unit.

8 Claims, 7 Drawing Sheets

(56) References Cited

U.S. PATENT DOCUMENTS

| | | | |
|---|---|---|---|
| 2010/0058754 A1* | 3/2010 | Fong | F03B 13/1815 60/506 |
| 2014/0138954 A1* | 5/2014 | Antonucci | F03B 17/061 290/54 |
| 2015/0210362 A1* | 7/2015 | Ruiz Diez | B63B 35/44 114/61.1 |

* cited by examiner

WATER WAVE-TYPE POWER GENERATING DEVICE

CROSS-REFERENCE TO RELATED APPLICATION

This application claims priority of Taiwanese Patent Application No. 104140040, filed on Dec. 1, 2015.

FIELD

The disclosure relates to a power generating device, and more particularly to a water wave-type power generating device.

BACKGROUND

Referring to FIG. 1, a conventional water wave-type power generating device includes a base 11 for mounting a plurality of power generators (not shown), and a plurality of driving units 13 disposed on the base 11 at left and right sides thereof. Each driving unit 13 has a connecting seat 131 secured on the base 11, a rotary member 132 rotatably mounted on the connecting seat 131 and having a plurality of blades 134 rotated by water waves, and a transmitting member 133 coupled with the rotary member 132 and the respective power generator. The transmitting member 133 is disposed on the connecting seat 131 and includes two bevel gears 135, 136 to transmit a rotational drive from the rotary member 132 to the power generator so as to generate electric power. Since only a part of wave energy is received by the rotary member 132 to generate the rotational drive to the power generator, the power generating efficiency is limited. Moreover, the driving units 13 are subjected to impact of the water waves, which may result in damage to the driving units 13 after a long term use.

SUMMARY

Therefore, an object of the disclosure is to provide a water wave-type power generating device that can alleviate at least one of the drawbacks of the prior art.

According to the disclosure, the water wave-type power generating device includes a support unit including a hub which is disposed to have a hub axis thereof parallel to a shoreline, a power generating unit disposed on the hub and converting a torque into electric power, a transmitting track unit surrounding the hub and movable relative to the hub around the hub axis along an endless course to generate a rotational force, a rotation transmitting unit coupled with the transmitting track unit and receiving the rotational force to generate the torque, a torque transmitting unit coupled with the rotation transmitting unit and the power generating unit so as to transmit the torque to the power generating unit, and an actuating unit including a plurality of wave heading members which are disposed on the transmitting track unit and which are spaced apart from each other along the endless course. Each of the wave heading members has a heading surface that is subjected to waves in a wave ascending direction so as to actuate the movement of the transmitting track unit along the endless course.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
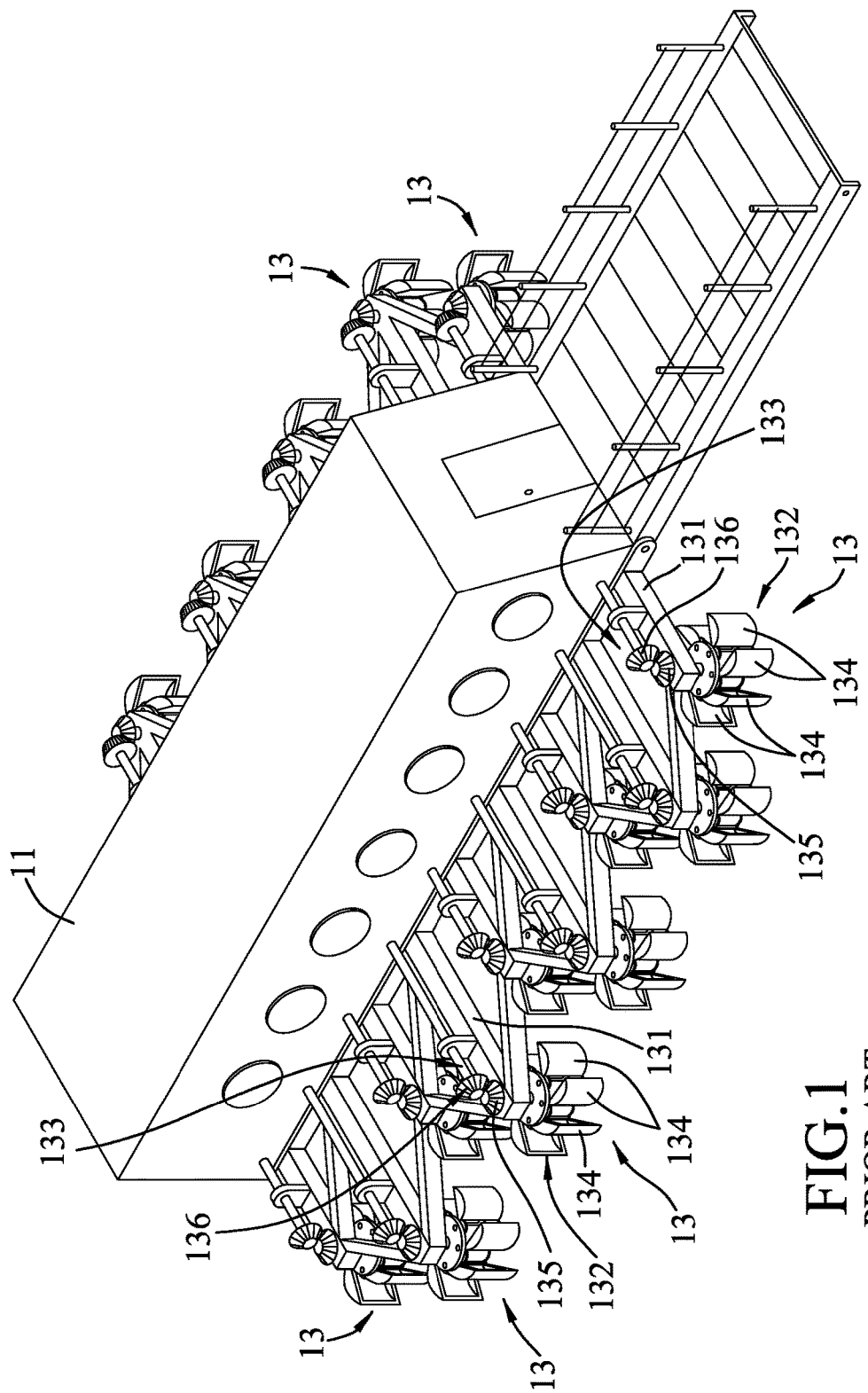
FIG. 1 is a perspective view of a conventional water wave-type power generating device.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
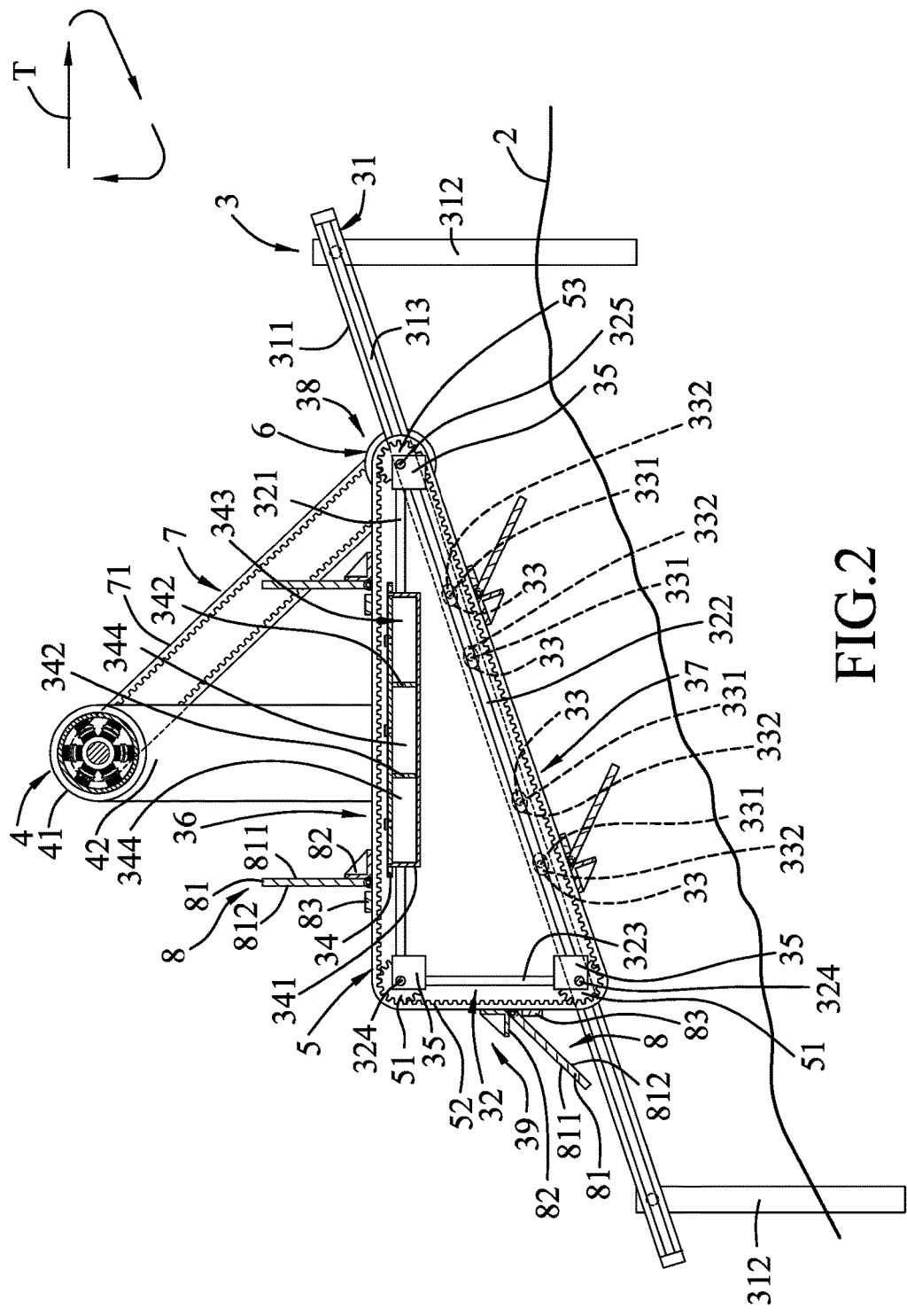
FIG. 2 is a schematic side view of an embodiment of a water wave-type power generating device according to the disclosure.
Figure 3:
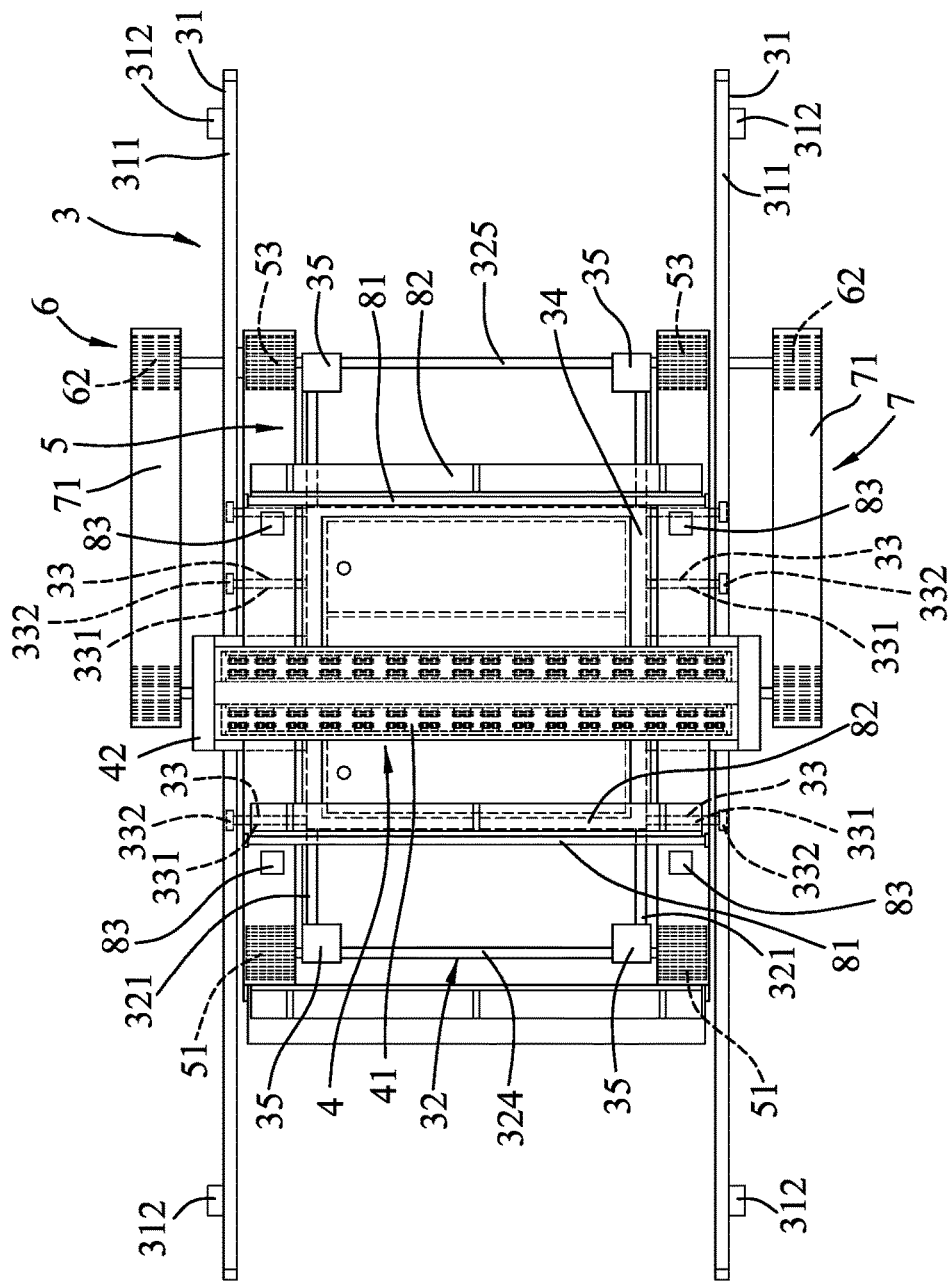
FIG. 3 is a schematic top view of the embodiment.
Figure 4:
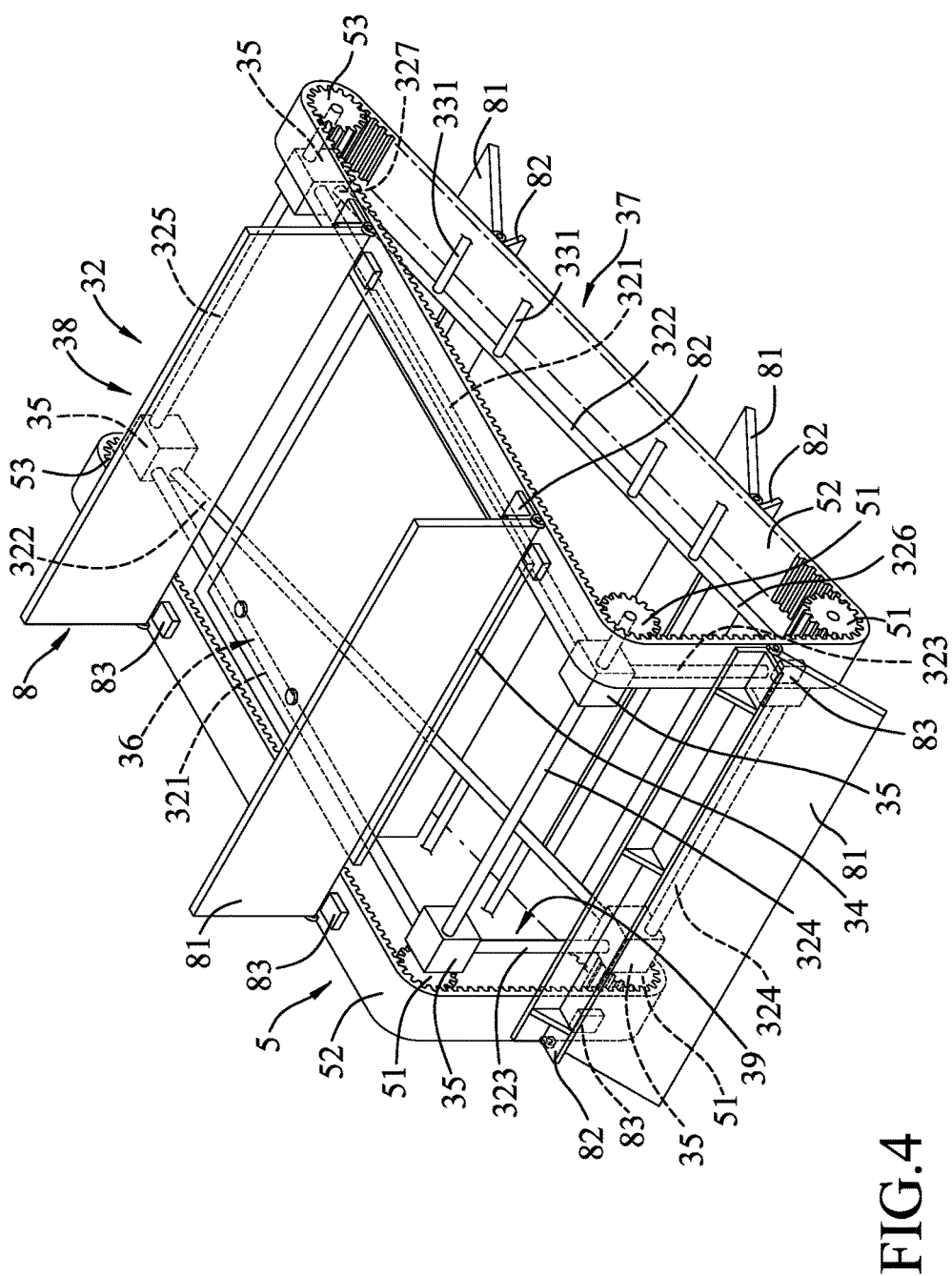
FIG. 4 is a perspective view of the embodiment, with two guiding rails and a power generating unit being omitted for the sake of clarity.
Figure 5:
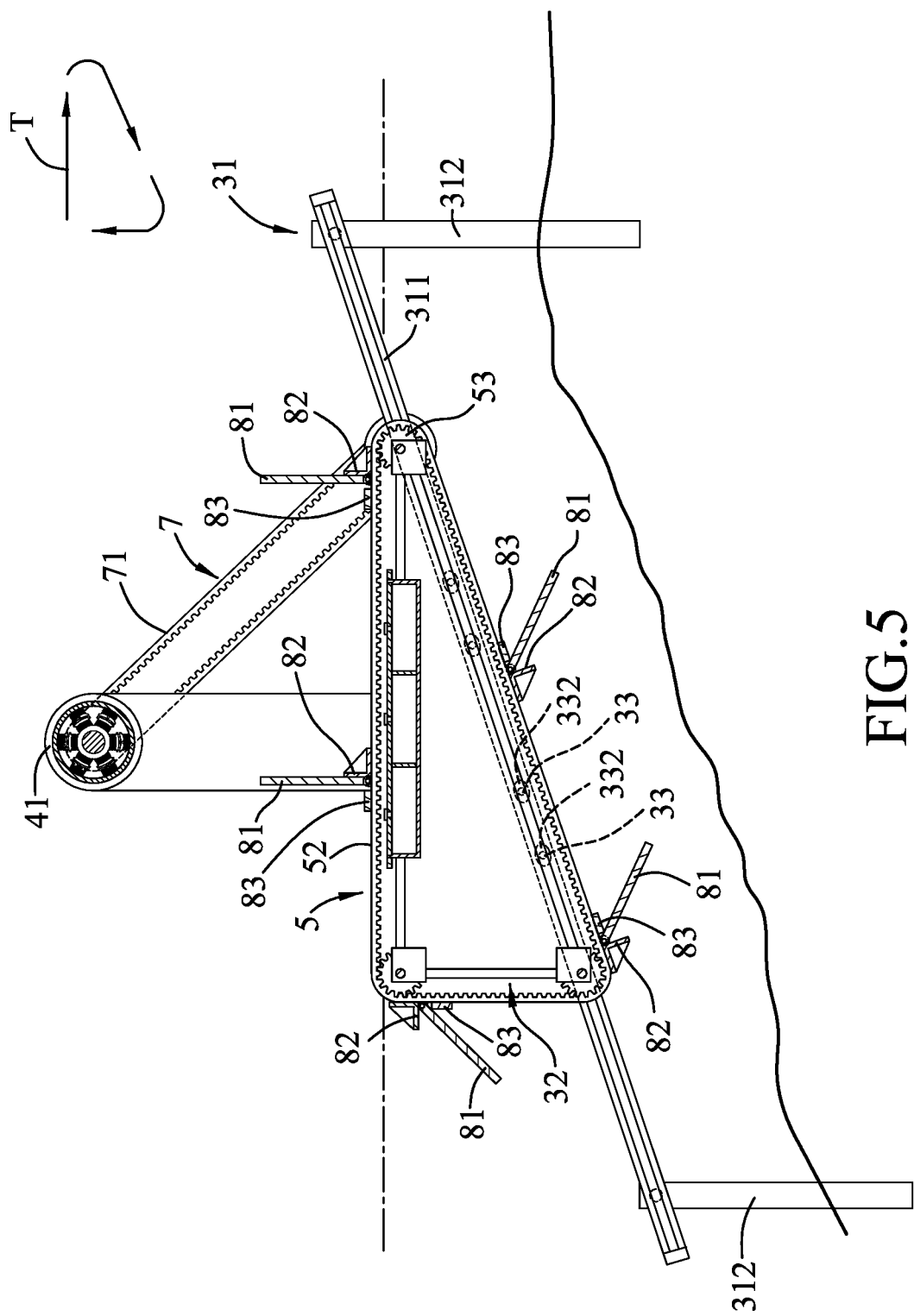
FIG. 5 is a schematic side view illustrating a state of use.

Referring to FIGS. 2 to 4, an embodiment of a water wave-type power generating device according to this disclosure is adapted to be mounted on a shore 2, such as a seashore, a lakeshore, and the like, so as to convert wave energy into electric power. In this embodiment, the power generating device is mounted on a sand beach. In the following description, a wave ascending direction indicates the traveling direction of ascending waves toward the land, a wave descending direction indicates the traveling direction of descending waves toward the water.

The water wave-type power generating device includes a support unit 3, a power generating unit 4, a transmitting track unit 5, a rotation transmitting unit 6, a torque transmitting unit 7 and an actuating unit 8.

The support unit 3 includes a pair of guiding rails 31 disposed to be spaced apart from each other along a shoreline, a hub 32 movable along the guiding rails 31, a plurality of guiding members 33 interconnecting the hub 32 and the guiding rails 31, and a buoyant board 34 disposed on the hub 32.

Each of the guiding rails 31 includes a pair of support rods 312 securely mounted on the shore 2, and a rail portion 311 propped by the support rods 312. The rail portion 311 extends in the wave descending direction and is inclined downwardly toward a water bottom. In this embodiment, the rail portion 311 extends parallel to the shore 2, as shown in FIG. 2, so as to reduce impact of waves. The rail portion 311 has a rail channel 313 with a C-shaped cross-section. Each support rods 312 may tilt in the wave ascending direction so as to reduce impact of waves thereto.

The hub 32 includes a pair of horizontal rods 321 spaced apart from each other to define an upper horizontal region 36, a pair of inclined rods 322 respectively disposed below the horizontal rods 321 and spaced apart from each other to define a lower inclined region 37, two vertical shafts 323 each connected between the respective horizontal rod 321 and the respective inclined rod 322, an upper offshore crossbar 324 connected between the horizontal rods 321, a lower offshore crossbar 324 connected between the inclined rods 322 and cooperating with the upper offshore crossbar 342 and the vertical shafts 323 to define an offshore region 39, a near-shore crossbar 325 connected between the inclined rods 322 to define a near-shore region 38, and a plurality of adapting pieces 35 for connecting adjacent ones of the above-mentioned rods, shafts and crossbars.

Each horizontal rod 321 extends horizontally and in the wave ascending direction so as to permit the upper horizontal region 36 to extend in the wave ascending direction and to have an upper near-shore end and an upper offshore end. Each inclined rod 322 extends in the wave ascending direction to permit the lower inclined region to have a lower near-shore end below the upper near-shore end, and a lower offshore end below the upper offshore end, and is inclined downwardly from the lower near-shore end to the lower offshore end. The near-shore region 38 interconnects the upper and lower near-shore ends. The offshore region 39 interconnects the upper and lower offshore ends. Thus, an endless course (T) is defined by the upper horizontal region 36, the near-shore region 38, the lower inclined region 37 and the offshore region 39, and surrounds about a hub axis of the hub 32 that is parallel to the shoreline. In this embodiment, the endless course (T) has a generally wedge or triangular profile. Note that the above-mentioned rods, shafts and crossbars are connected to each other by the adapting pieces 35, and may be connected by any other fastening means, such as welding, riveting or the like.

Four of the guiding members 33 are mounted on each inclined rod 322. Each guiding member 33 includes a connecting rod 331 connected to and laterally extending from the inclined rod 322, and a guided piece 332 connected to the connecting rod 331 and configured to be frictionally slidable on the rail channel 313 of the respective guiding rail 31. In this embodiment, the guided piece 332 is of an ellipsoidal shape, and may be of a ball or cubic shape in other embodiments.

The buoyant board 34 is disposed on the hub 32, and has a base plate portion 341 recessed to define a buoyant chamber 343, and a plurality of partition plate portions 342 disposed to divide the buoyant chamber 343 into a plurality of buoyant spaces 344. A predetermined amount of water can be received in the buoyant spaces 344 to vary a buoyant force of the hub 32.

The power generating unit 4 includes a power generator 41 of a known type, which is supported by a bracing member 42 disposed on the hub 32. The power generator 41 is disposed to convert a torque into electric power.

The transmitting track unit 5 is disposed to surround the hub 32 and is movable around the hub axis along the endless course (T) to generate a rotational force. The transmitting track unit 5 includes two pairs of first transmitting wheels 51, each pair rotatably disposed on the hub 32 adjacent to the upper and lower offshore ends, respectively, two second transmitting wheels 53 rotatably disposed on the hub 32 adjacent to the lower near-shore end, and two belts 52, each trained on the first transmitting wheels 51 of each pair and the second transmitting wheel 53 to be moved in the upper horizontal region 36, the near-shore region 38, the lower inclined region 37 and the offshore region 39 along the endless course (T).

The rotation transmitting unit 6 is coupled with the transmitting track unit 5 to receive the rotational force to generate the torque. In this embodiment, the rotation transmitting unit 6 includes two rotary wheels 62, each of which is coaxial and rotated with the respective second transmitting wheel 53, and is coupled with the torque transmitting unit 7 to transmit the torque generated by rotation thereof. In this embodiment, the rotary wheels 62 are disposed outboard of the second transmitting wheels 53, respectively.

The torque transmitting unit 7 is coupled with the rotation transmitting unit 6 and the power generator 41 so as to transmit the torque to the power generator 41. In this embodiment, the torque transmitting unit 7 includes two transmitting belts 71 each connected between the respective rotary wheel 62 and a rotor (not shown) of the power generator 41.

The actuating unit 8 includes a plurality of wave heading members 81 which are disposed on the belts 52 and which are spaced apart from each other along the endless course (T). Each wave heading member 81 has a heading surface 812 that confronts waves in the wave ascending direction so as to actuate movement of the transmitting track unit 5 along the endless course (T). In this embodiment, each wave heading member 81 is turnable relative to the belt 52, and has leading and tailing surfaces 811, 812 in a moving direction of the belt 52 (the tailing surface 812 serves as the heading surface 812 when the wave heading member 81 is in the upper horizontal region 36). The actuating unit 8 further includes a plurality of leading holding members 82, each disposed leading of the leading surface 811 of the respective wave heading member 81 to hold the leading surface 811 upright when the respective wave heading member 81 is moved to the upper horizontal region 36, and a plurality of trailing holding members 83, each disposed trailing of and spaced apart from the trailing surface 812 of the respective wave heading member 81 to permit tilting of the respective wave heading member 81 when the respective wave heading member 81 is moved to the lower inclined region 37. Each leading holding member 82 is triangular in cross-section, and has a height less than half of that of the respective wave heading member 81.

In assembly, the vertical position of the horizontal rods 321 of the hub 32 can be adjusted to be substantially flush with a water level of the water by filling a determined amount of water into the buoyant spaces 344. With the hub 32 of a wedge or triangular shape in this embodiment, the lower inclined region 37 can be disposed substantially parallel to the shore 2 so as not to be obstructed by the shore 2 for facilitating assembly and adjustment thereof.

Referring to FIGS. 4 to 8, in use, the wave heading members 81 in the upper horizontal region 36 which are subjected to water waves and which are held uprightly by the leading holding members 82 are moved in the wave ascending direction, so as to move the belts 52 along the endless course (T). By means of the movement of the belts 52 along the endless course (T), the second transmitting wheels 53 as well as the rotary wheels 62 (see FIG. 3) are rotated so as to generate the torque that is to be transmitted to the power generator 41. The second transmitting wheels 53 and the rotary wheels 62 may be configured with a different dimension for generating a larger or smaller torque to the power generator 41.

Figure 8:
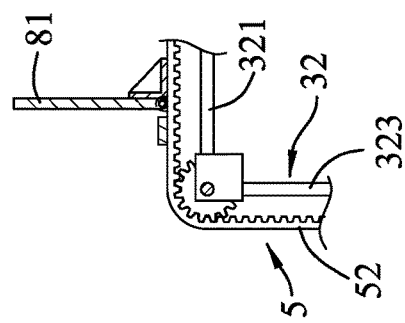
FIGS. 6 to 8 are fragmentary schematic views illustrating a state where a wave heading member is moved along an endless course.
Figure 7:
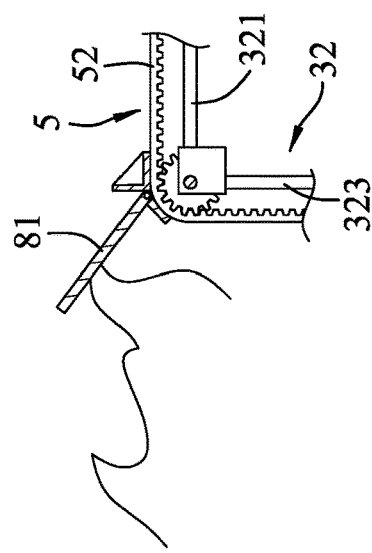
Figure 6:
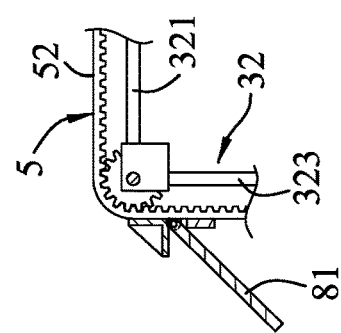

During the movement of each wave heading member 81 from the upper horizontal region 36 to the lower inclined region 37, the wave heading member 81 is subjected to an impact from the water, and then is tilted toward and abuts against the respective trailing holding member 83. In this tilted state, drag force acted upon the wave heading members 81 during movement in the water can be reduced for facilitating movement thereof. When the wave heading member 81 is lifted with the movement of the belts 52 from the offshore region 39 to the upper horizontal region 36, as shown in FIGS. 6 to 8, the wave heading member 81 remains in the tilted state until approaching the upper horizontal region 36, where the wave heading member 81 is subjected to water waves to stand uprightly and to receive subsequent water waves.

With the hub 32 slidably disposed on the guiding rails 31, the vertical height of the hub 32 can be automatically adjusted in accordance with flood and ebb tides of the water occurred on a daily basis and high and low tides of the water occurred on a monthly basis. For example, when high or flood tides occur, the hub 32 is moved along the guiding rails 31 toward the land due to buoyancy of the water so as to increase the vertical height of the hub 32. When low or ebb tides occur, the hub 32 is moved along the guiding rails 31 toward the water by gravity so as to decrease the vertical height of the hub 32. Thus, the wave heading members 81 in the upper horizontal region 36 are constantly subjected to slapping of waves so as to ensure a good power generating efficiency. Moreover, the configuration of the guided pieces 332 being ellipsoidal in this embodiment enables the guided members 33 to be movable along the guiding rails 31 as mentioned above for changing the vertical position of the hub 32 at the high or low tide period, and provides frictional engagement between the guided members 33 and the guiding rails 31 so as to restrain movement of the hub 32 relative to the guiding rails 31 at the non high or low tide period.

As illustrated, by having waves slapping the wave heading members 81 in the wave ascending direction to move the transmitting track unit 5 along the endless course (T), a large amount of wave energy is converted to a torque for generating electric power, which results in a high power generating efficiency. Moreover, by virtue of the movable transmitting track unit 5, undesired impact of waves in the wave ascending direction to this device is effectively reduced so as to prolong the service life thereof.

Figure 9:
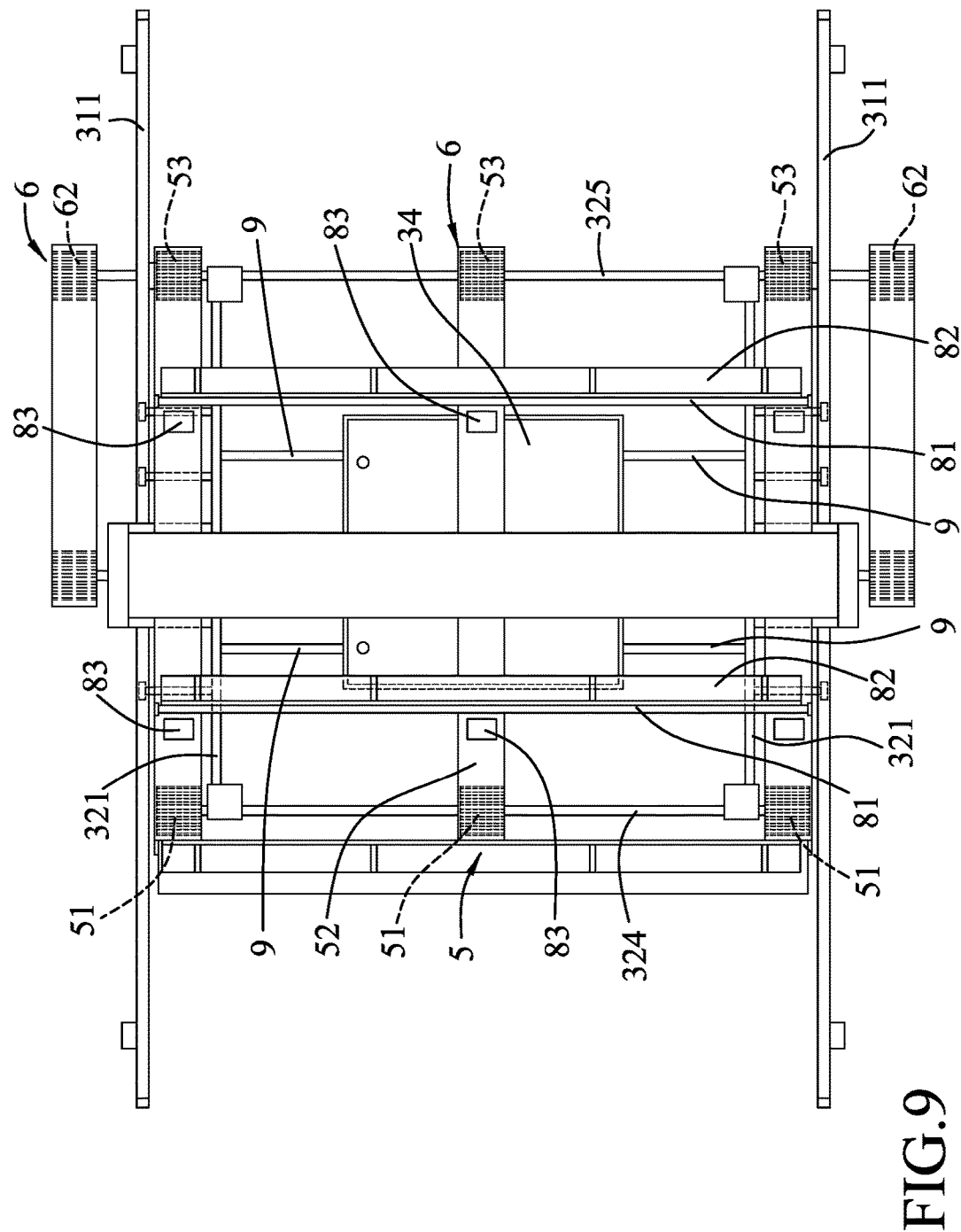
FIG. 9 is a schematic top view of another embodiment of the water wave-type power generating device according to the disclosure.

Referring to FIG. 9, another embodiment of the water wave-type power generating device according to this disclosure is substantially similar to that of the above-mentioned embodiment in construction but has a wider configuration. In other words, each of the offshore and near-shore crossbars 324, 325, the wave heading members 81 and the leading holding members 82 is elongated, and the distance between the rail portions 311 is increased. Moreover, in order to make the buoyant board 34 to provide proper buoyant and resistance forces, and to ensure a secure connection of the buoyant board 34 with the horizontal rods 321, four support crossbars 9 are disposed to interconnect the buoyant board 34 and the horizontal rods 321 so as to permit the buoyant board 34 to have a relatively small dimension. Besides, two additional first transmitting wheels 51 are disposed on the upper and lower offshore crossbars 324 at a middle portion thereof, an additional second transmitting wheel 53 is disposed on the near-shore crossbar 325 at a middle portion thereof, and an additional belt 52 is trained on the additional first and second transmitting wheels 51, 53 so as to firmly and stably support the actuating unit 8 thereon. It is appreciated that the power generating device according to this disclosure can be used on different types of shores. For example, by increasing the width of the device and the numbers of the first and second transmitting wheels 51, 53 and of the belt 52, the power generating device is suitable for long shorelines.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A water wave-type power generating device for mounting on a shore, comprising:
    a support unit including a hub which is disposed to have a hub axis thereof parallel to a shoreline;
    a power generating unit disposed on said hub and converting a torque into electric power;
    a transmitting track unit surrounding said hub and movable relative to said hub around the hub axis along an endless course to generate a rotational force;
    a rotation transmitting unit coupled with said transmitting track unit and receiving the rotational force to generate the torque;
    a torque transmitting unit coupled with said rotation transmitting unit and said power generating unit so as to transmit the torque to said power generating unit; and
    an actuating unit including a plurality of wave heading members which are disposed on said transmitting track unit and which are spaced apart from each other along the endless course, each of said wave heading members having a heading surface that is subjected to waves in a wave ascending direction so as to actuate movement of said transmitting track unit along the endless course,
    wherein said support unit includes at least one guiding rail which is securely mounted on the shore, which extends in a wave descending direction and which is inclined downwardly toward a water bottom, and a plurality of guided members which are disposed on said hub and which are movable along said guiding rail to move said hub relative to said guiding rail so as to change a vertical position of said hub.

2. The water wave-type power generating device as claimed in claim 1, wherein each of said guided members includes a connecting rod connected to and laterally extending from said hub, and a guided piece connected to said connecting rod and configured to be frictionally slidable on said guiding rail.

3. The water wave-type power generating device as claimed in claim 1, wherein said hub has an upper horizontal region extending in the wave ascending direction to have an upper near-shore end and an upper offshore end, a lower inclined region extending in the wave ascending direction to have a lower near-shore end below said upper near-shore end, and a lower offshore end below said upper offshore end, and inclined downwardly from said lower near-shore end to said lower offshore end, a near-shore region interconnecting said upper and lower near-shore ends, and an offshore region interconnecting said upper and lower offshore ends.

4. The water wave-type power generating device as claimed in claim 3, wherein said hub includes a pair of horizontal rods spaced apart from each other to define said upper horizontal region, a pair of inclined rods spaced apart from each other to define said lower inclined region, an upper offshore crossbar connected between said horizontal rods, a lower offshore crossbar connected between said inclined rods and cooperating with said upper offshore crossbar to define said offshore region, and a near-shore crossbar connected between said inclined rods to define said near-shore region.

5. The water wave-type power generating device as claimed in claim 3, wherein said transmitting track unit includes at least two first transmitting wheels rotatably disposed on said hub adjacent to said upper and lower offshore ends, respectively, at least one second transmitting wheel rotatably disposed on said hub adjacent to said lower near-shore end, and a belt trained on said first and second transmitting wheels to be moved on said upper horizontal region, said near-shore region, said lower inclined region and said offshore region so as to define the endless course, said wave heading members being disposed on said belt, said rotation transmitting unit including at least one rotary wheel which is coaxial and rotated with said second transmitting wheel, and which is coupled with said torque transmitting unit to transmit the torque generated by rotation thereof.

6. The water wave-type power generating device as claimed in claim 5, wherein each of said wave heading members is turnable relative to said belt, and has leading and tailing surfaces in a moving direction of said belt, said actuating unit further including a plurality of leading holding members, each disposed leading of said leading surface of a respective one of said wave heading members to hold said leading surface upright when said respective wave heading member is moved on said upper horizontal region, and a plurality of trailing holding members, each disposed trailing of and spaced apart from said trailing surface of said respective wave heading member to permit tilting of said respective wave heading member when said respective wave heading member is moved to said lower inclined region.

7. The water wave-type power generating device as claimed in claim 1, wherein said support unit further includes a buoyant board disposed on said hub and defining therein a buoyant chamber for receiving water so as to vary a buoyant force of said hub.

8. The water wave-type power generating device as claimed in claim 7, wherein said buoyant board has a base plate portion configured to define said buoyant chamber, and a plurality of partition plate portions disposed to divide said buoyant chamber into a plurality of buoyant spaces.

* * * * *